Jan. 19, 1932.    W. T. HONISS    1,842,367
AUTOMATIC TEMPERATURE CONTROL
Filed Oct. 15, 1929    3 Sheets-Sheet 1
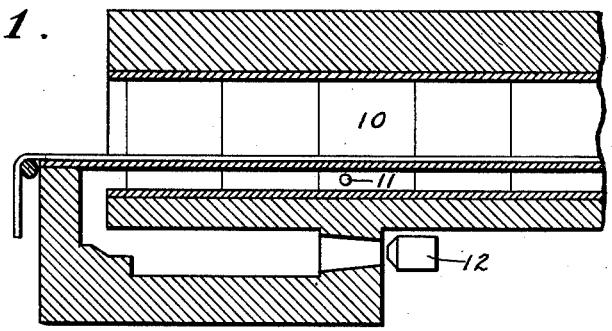
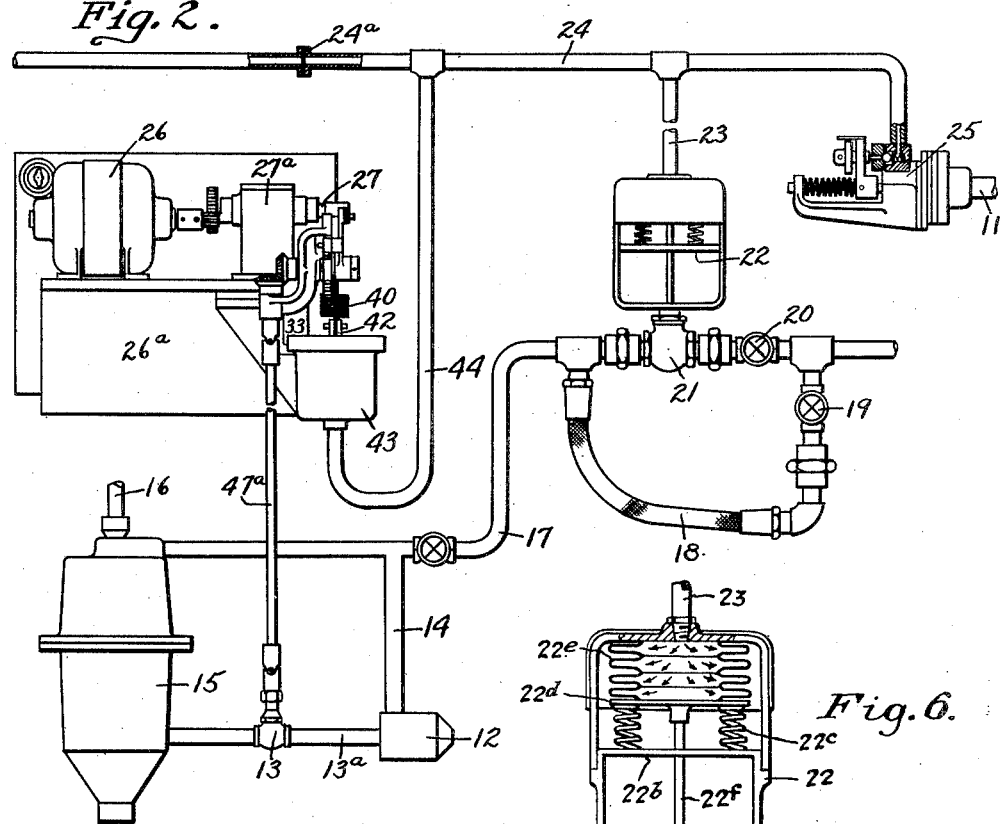
Witness:
G. A. Duling
Inventor
William T. Honiss
by Brown & Parham
Attorneys.

Jan. 19, 1932. W. T. HONISS 1,842,367
AUTOMATIC TEMPERATURE CONTROL
Filed Oct. 15, 1929   3 Sheets-Sheet 2

Witness:
G. A. Duberg

Inventor
William T. Honiss
by Brown & Pachow
Attorneys.

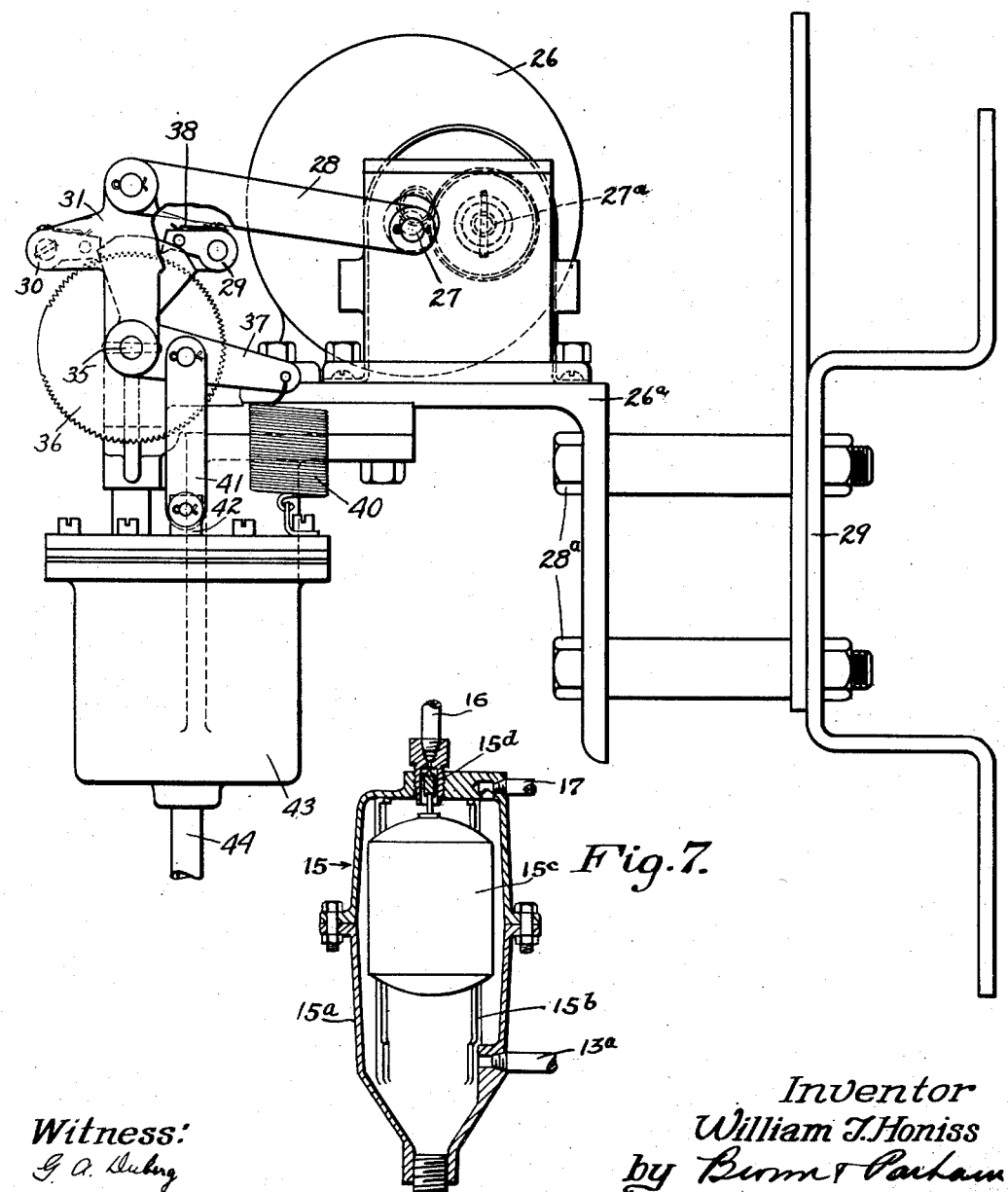

Patented Jan. 19, 1932

1,842,367

UNITED STATES PATENT OFFICE

WILLIAM T. HONISS, OF WEST HARTFORD, CONNECTICUT, ASSIGNOR TO HARTFORD-EMPIRE COMPANY, OF HARTFORD, CONNECTICUT, A CORPORATION OF DELAWARE

AUTOMATIC TEMPERATURE CONTROL

Application filed October 15, 1929. Serial No. 399,750.

This invention relates to automatic control for burners using liquid or gaseous fuel, and more particularly to a combination of the controls known as the "progressive" and "off-and-on" types.

The invention consists, broadly, of means for varying the amount of oil supply to an oil burner, and comprises thermally controlled means for varying the amount of oil forced through a given opening and means responsive to the same means for varying the size of the opening progressively until the desired temperature conditions are reached, at which time the process is reversed.

An object of the invention is to provide a pneumatic means responsive to thermal control for varying the amount of oil passed through a valve without moving said valve, and means responsive to the action of said pneumatic means for intermittently moving the valve.

Another object of the invention is to provide means for giving a quick response to fuel demands through a limited range by pneumatic means, and at the same time response to the operation of the pneumatic means for actuating mechanical means to vary the supply of fuel through greater ranges more slowly.

A further object of the invention is to provide means for causing a valve in a fuel line to have a continual intermittent motion.

In the drawings,

Fig. 1 is a longitudinal view, partially in section, of a lehr and certain connections thereto;

Fig. 2 is a diagrammatic view of an entire device embodying my invention, showing certain details in section;

Fig. 4 is an end view of the valve-regulating mechanism, showing other parts of said mechanism and the mounting of the device on the lehr;

Fig. 6 is a diagrammatic view of a diaphragm valve shown in Fig. 2; and

Fig. 7 is a vertical sectional view of the oil float tank shown in Fig. 2.

Figure 3:
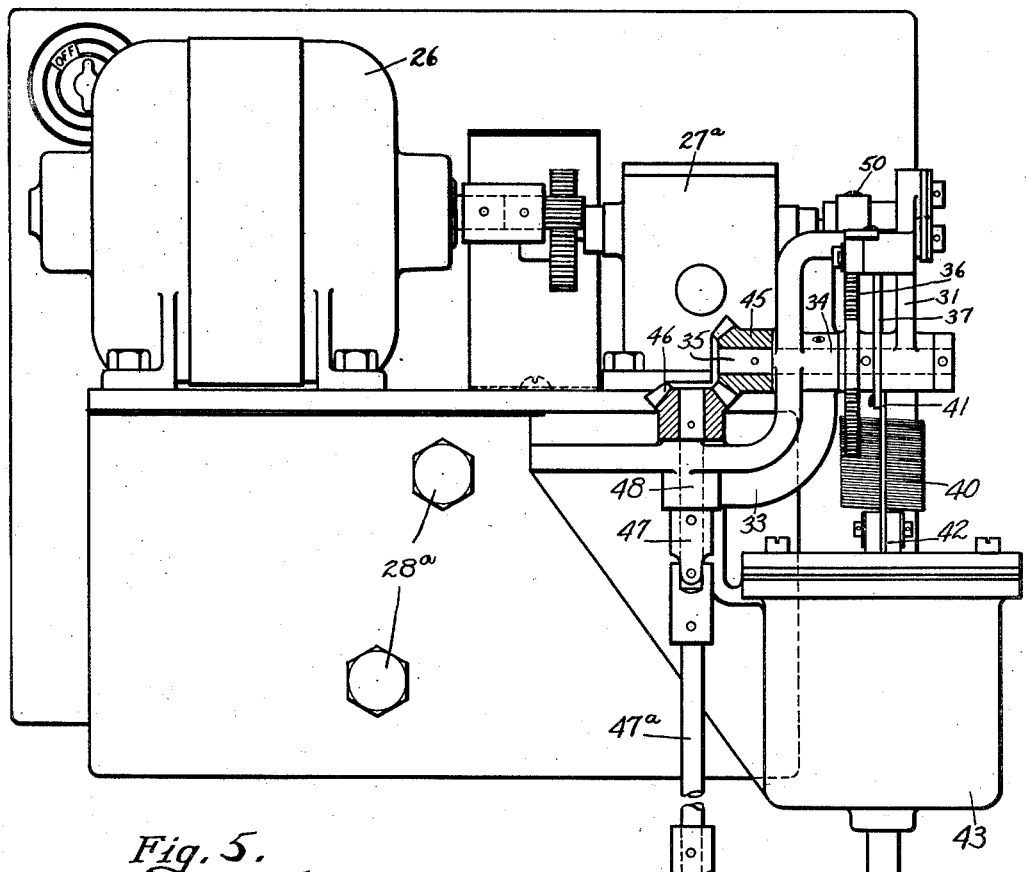
Fig. 3 is a similar view in more detail of the valve control means shown in Fig. 2.

Referring to the drawings, (Fig. 1) a lehr, generally designated as 10, is diagrammatically shown. Such lehr may be of any suitable type of fuel fire lehr, such, for example, as that shown in the patent to Mulholland No. 1,560,481. Mounted in operative connection therewith is a heat-responsive element 11, which is adapted in connection with other parts, hereinafter described more in detail, to operate a valve, which in turn regulates the supply of oil to an oil burner 12. The lehr is used for illustrative purposes only as it is obvious that the automatic control can be used with many other types of fluid fuel fired heaters.

Referring more particularly to Fig. 2, the oil burner 12 is connected to an oil pipe line 13a and an air pressure pipe line 14. At the other end of the oil pipe line 13a is an oil float tank 15 adapted to maintain an approximately constant oil level. In the pipe line 13a is mounted a needle valve 13, the operation of which will be described more particularly hereinafter. Entering the upper end of the float tank is a pipe 16 which leads to a source of fuel supply (not shown). An air pressure pipe 17 also enters the upper portion of tank 15 and variations in air pressure in that pipe are made use of to vary the flow of oil from the tank.

As shown in Fig. 7, the float tank 15 comprises a casing 15—a within which, held in a vertical position by guideways 15—b, is a float 15—c. The upper end of the float is suitably connected with a valve 15—d which, when the float is in raised position, shuts off the flow of oil through the pipe 16, and which, when the supply of oil in the tank is lowered and the float sinks, opens and admits oil to the tank.

The pipe 14 connects with the pipe 17. The pipe 17 leads to a source of air under pressure (not shown). Included in said pipe line 17 is a by-pass 18 in which is located a valve 19 adapted to regulate the minimum amount of air allowed to travel through the pipe 17 and its connections. Another valve 20 is mounted on pipe line 17 closer to the source of supply than the end of the by-pass 18 for regulating the maximum amount of air allowed to pass through the pipe 17. Located in the pipe 17 between the two ends of the by-pass 18 is a valve 21 adapted to be opened and closed by the action of a diaphragm 22. All the valves mentioned may be of any preferred type, suitable for their respective purposes.

As shown in Fig. 6, a suitable type of diaphragm valve comprises a casing 22—a in which a cross member 22—b supports springs 22—c in contact with the outer side of a face 22—d of an expansible diaphragm 22—e. Fixedly connected to the face 22—d of the diaphragm and slidably mounted in the casing of the diaphragm valve is a rod 22—f. The face of the diaphragm is raised and lowered by the admission and exhaust of air to and from the interior of the diaphragm. If the air pressure is sufficient to overcome the effect of the springs 22—c, the rod 22—f is lowered, and if insufficient to overcome the effect of the springs, the rod is raised. This raising and lowering of the rod 22—f, as will be obvious from the drawings, opens and closes the valve 21.

Connected with the upper portion of the diaphragm 22 is a pipe 23 which in turn is connected with a pipe 24. One end of the pipe 24 is connected with a source of constant air pressure (not shown). The other end is connected with a thermally operated valve 25 which is adapted to either build up or release air pressure from the pipe 24 and its connections in response to movements controlled by the actions of the heat-responsive member 11. Inasmuch as the thermally operative valve does not in itself form a part of this invention, it may be of any suitable known type. As a suitable device is described in great detail both as to its construction and its operation in the application for United States Letters Patent of Vergil Mulholland and myself, Serial No. 199,823, filed June 18, 1927, the further description thereof in this application is believed useless, except as its operation is correlated with the action of other members described herein. In the pipe line 24, located between the source of pressure and the diaphragm, is an orifice 24a, preferably of the size made by No. 60 drill, which serves to help restrict the flow of air pressure in the pipe line 24 between the source of supply and the thermally operated valve 25, thus enabling the valve 25 which controls exhaust of pressure from the pipe 24 to the right of the orifice 24a (Fig. 2) to control the pressure in this portion of the pipe 24 and hence that within the diaphragm 22 thereby to control the valve 21.

The operation of the parts thus far described is as follows:

Assuming oil being regularly admitted to the oil float tank and insufficient heat as yet generated to cause the heat-responsive element 11 to open valve 25 to bleed pressure from the pipes, pressure has built up in the pipe line 24 and 23 and depressed the diaphragm 22, opening the valve 21 to its fullest extent, thus maintaining at a maximum the pressure supplied in the oil float tank 15 through pipes 17 and maintaining at a maximum the oil forced to the burner 12 through the needle valve 13. Likewise the maximum amount of atomizing air is supplied to the burner through the pipe 14 which connects with the pipe 17. The maximum air pressure supplied is determined by the regulation of the valve 20. When the desired temperature is reached, the thermally operated valve 25 is opened by the element 11 and bleeds air from the pipes 24 and 23, thus causing the valve 21 to close and to reduce to a minimum pressure throughout the air line 17, and consequently the amount of oil forced through the needle valve 13 and the atomizing air forced through the pipe 14. The minimum pressure is determined by the setting of the valve 19.

In addition to the control above described, I provide a further control which consists generally of means for opening and closing the needle valve 13. It comprises the unidirectional motor 26 mounted on the base 26a, which is attached by means of bolts 28a to a framework 29 of the lehr 10. This motor drives a shaft 27 through suitable reduction gears 27a. The shaft 27 carries a crank arm or eccentric to which a connecting rod 28 is connected. The other end of the rod 28 is pivotally connected to a rocker arm 31 which is pivoted on a shaft 35 and which carries a pair of pawls 29 and 30. The rod 28 thus translates the rotary motion of the motor into an oscillatory motion of pawls 29 and 30. The shaft 35 is mounted in bearing 34 provided in the arm 33 formed of an extension of the base 26a. A ratchet wheel 36 is fixed on the shaft 35. The pawls 29 and 30 are thrown into and out of operative relation with the ratchet wheel 36 by means of a cam formed in one end of a bell crank lever 37 which is pivoted on the shaft 35 and to the other end of which is attached a spring 40 adapted to hold the cam in operative engagement with one of the pawls. Each of the pawls is provided with a spring 38 which forces the pawl toward the wheel when the cam permits such movement.

Fixedly mounted on the end of the shaft 35 is a bevelled gear 45 adapted to transmit motion to a bevelled gear 46 which is fixedly mounted on a shaft 47 extending through a bearing 48 in the arm 33. The shaft 47 may be connected by a universal connection 47a to the stem of the needle valve 13.

Movably mounted intermediate the ends of the arm of the bell crank lever 37 to which the spring 40 is attached, is a connecting rod 41. The other end of the rod 41 is attached to the diaphragm 42 of an air cylinder 43, which may be similar to the diaphragm 22 hereinbefore described. The end of the cylinder 43 opposite the diaphragm 42 is connected by a pipe 44 to the pipe 24 between the orifice 24a and thermally operated valve 25. The operation of the mechanism just described is as follows:

By the same means and at the same time as pressure is built up in the diaphragm 22, pressure is built up under diaphragm 42; the connecting rod 41 is forced upwardly and as it rises pushes upwardly the lower arm of the bell crank lever 37, thus disengaging the pawl 30 and allowing pawl 29 to come into operative engagement with the ratchet wheel 36. The motor 26 is continuously rotating and as the pawl 29 comes into engagement with the wheel 36 turns the wheel notch-by-notch by means of the linkage existing between the rocker arm 31 upon which the pawls are mounted and the motor, thus through the wheel imparting a rotative motion to the shaft 47, and thence to the needle valve 13, and opening it gradually as the wheel is moved notch-by-notch.

When the thermally operated valve 25 acts in the opposite sense and decreases pressure in the pipe line 24, the pressure under diaphragm 42 is reduced and the spring 40 lowers the end of the bell crank lever 37 to which the spring is attached and through the action of the cam on the other end thereof, throws out of operation the pawl 29 and allows the pawl 30 to come into operation, as shown in Fig. 4, thus rotating the wheel 36 in the opposite direction and closing the needle valve 13.

Figure 5:
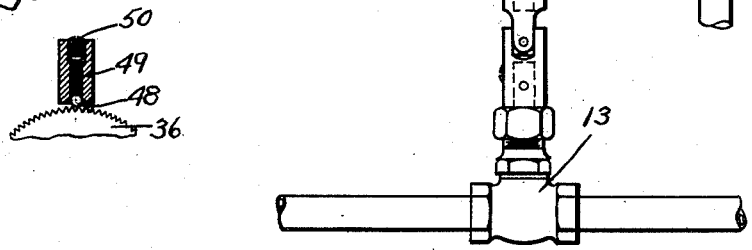
Fig. 5 is a more detailed view, partially in section, of a catch and portion of a ratchet wheel shown in Fig. 4.

A means preventing movement of the ratchet wheel 36 save under the action of the pawls is shown in Fig. 5, and consists of a ball 48 which is mounted through a slot in a portion of the arm 33 and held against the ratchet wheel by means of a spring 49 and a screw 50.

From the foregoing description, it will be evident that when the thermally operated valve 25 builds up pressure in the pipe line 24 and consequently in the pipe lines 23 and 44, the diaphragms 42 and 22 will be simultaneously operated, assuming that the diaphragms are responsive to similar pressures. It follows that the result of the operation of the thermally operated valve is to give a sudden surge or impulse to the fuel forced through the valve 13 without varying the size of the opening, and thereafter, as motion is transmitted from the motor 26, to open the valve 13 gradually, uniformly, continually step-by-step until the thermally operated valve acts in an opposite sense. This movement I consider to be a "continual intermittent" movement and do so refer to it. Except in a variable form of my invention, this movement continues from the beginning of the operation of the control until it is turned off, although the direction thereof changes with the heat conditions.

Other than the immediate regulating effect on the supply of fuel noted above as resulting from the continuous movement of the needle valve, it is found that as a further highly desirable result of this motion, the valve is kept free from cloggage to a great extent. Inasmuch as most of the fuel oil used today has sludge and other impurities therein, a tendency has been noted for valves to clog up and thus reduce the supply of oil going therethrough. Assuming that the supply of oil decreased, not resulting from the action of the regulating device but from some impediment, the temperature in the furnace would necessarily decrease and as the immediate result in accordance with my invention, there would be a surge of oil through the valve, which in many instances would clear away the impediment. Then if this does not happen, the valve opens in a jerky manner, due to the pawl and ratchet, which movement tends to dislodge any impediment. It will be noted that if an impediment such as a piece of pipe scale lodges in the valve and reduces the flow of oil therethrough, thus decreasing the temperature, the valve will open due to the pawl and ratchet control, until the desired temperature is reached, and if the impediment continues to remain in the valve after the desired temperature is reached both the "surge" control and the pawl and ratchet control will function at the more open position of the valve. It is obvious that the greater the size of the impediment, the greater will be the reduction in the amount of oil going through the valve, and consequently the the greater the valve will open. Thus the effort made to free the valve of any cloggage is proportionate to the amount thereof.

It is further to be noted that the heat control operates on the "fail-safe" theory; that is, if the thermally operated valve fails to operate or the air pressure acting on the diaphragms is reduced below the amount necessary, the supply of fuel fed to the burner is gradually decreased, thus preventing damage.

Another form which my invention may preferably take is one in which diaphragm 42 is responsive only to greater pressure than diaphragm 22, thus delaying the operation of the mechanism which opens or closes the valve 13 until a given period of time has elapsed after valve 21 has been opened. In the meantime, the pressure which has served to open the valve 21 will be sufficient to partially move the diaphragm 42 and move the bell-crank lever sufficiently to hold both pawls out of operation with the toothed wheel.

The described embodiments of my invention are for purposes of illustration only. It is obvious that various modifications may be made therein without departing from the spirit and scope of the invention as embodied in the following claims:

I claim:

1. An automatic fuel regulating device for oil burners, comprising a fuel line, an opening therein of determinable size, means responsive to thermostatic control for increasing the supply of fuel through said opening without varying the size thereof, and means responsive to the same thermostatic control for thereafter further increasing the supply of fuel by varying the extent of said opening.

2. An automatic fuel regulating device comprising a fuel line, a source of air pressure, means responsive to air pressure for varying the supply of fuel fed though the fuel line, thermostatic means for varying the air pressure, and other means responsive to the same variation of the air pressure for causing further variation in the supply of fuel through said fuel line.

3. An automatic fuel regulating device comprising a supply of fuel, a fuel burner, pneumatic means for initially varying the supply of fuel to said burner, means responsive to said pneumatic means for further varying the supply of fuel to said burner, and a thermostat for controlling the operation of said pneumatic means.

4. An automatic fuel regulating device comprising a fuel line, a valve therein, a thermostat, a fuel burner, pneumatic means responsive to a thermostat for varying the supply of fuel through said valve without varying the opening therethrough, and mechanical means for varying the opening in said valve, said mechanical means also being responsive to said pneumatic means.

5. An automatic fuel regulating device comprising a valve, pneumatic means for varying the supply of fuel through said valve, an electric motor in constant unidirectional motion, a clutch interposed between said motor and said valve adapted to change the direction of operation of said valve by said motor or to wholly interrupt the transfer of said motion, said clutch being responsive to said pneumatic means.

6. An automatic fuel regulating device comprising a fuel line, a valve therein, means responsive to thermostatic control for varying the supply of fuel fed through said valve without varying the opening thereof, and means similarly responsive to said thermostatic control for varying the opening in said valve, said last named means comprising a unidirectional motor, linkage between said motor and said valve, and a clutch responsive to said thermostatic control adapted to reverse or suspend the transmission of motion from said motor to said valve.

7. An automatic fuel regulating device comprising a fuel line, a valve therein, means responsive to thermostatic control for varying the supply of fuel fed through said valve without varying the opening thereof, and means similarly responsive to said thermostatic control for varying the opening in said valve, said last named means comprising a unidirectional motor, a ratchet wheel, means to transmit motion from said motor to said ratchet wheel, means to transmit motion from said ratchet wheel to said valve, and means for suspending or reversing the motion transmitted from said motor to said ratchet wheel.

8. An automatic fuel regulating device comprising a fuel line, a needle valve therein, means responsive to thermostatic control for varying the supply of fuel fed through said valve without varying the opening thereof, and means similarly responsive to said thermostatic control for varying the opening in said valve, said last named means comprising a unidirectional motor, a ratchet wheel, means to transmit motion from said motor to said ratchet wheel, means to transmit motion from said ratchet wheel to said valve, and pneumatic means thermostatically controlled for suspending or reversing the motion transmitted from said motor to said ratchet wheel.

9. An automatic fuel regulating device comprising a fuel line, a valve therein, means responsive to thermostatic control for varying the supply of fuel fed through said valve without varying the opening thereof, and means similarly responsive to said thermostatic control for varying the opening in said valve, said last named means comprising a unidirectional motor, linkage between said motor and said valve, means between said motor and said valve for reducing the speed of said motion, and means for interrupting or reversing transmission of said motion.

10. The method of automatically controlling an oil burner, which comprises varying the flow of oil through a given opening in a valve in a fuel supply line, continually imparting an intermittent motion to the valve, and thermostatically controlling the variation in the flow of oil and the direction of movement of the valve.

11. The method of automatically controlling an oil burner, which comprises varying the flow of oil through a given opening in a valve in a fuel supply line, and continually imparting an intermittent motion to the valve.

12. The method of automatically controlling an oil burner, which comprises varying a flow of oil through a given opening in a valve in a fuel supply line, continually imparting a jerky movement to the valve, and controlling the variations in the flow of oil and the direction of the movement imparted to the valve by a single thermostatic control.

13. An automatic fuel regulating device, comprising a valve, means to vary the amount of fuel passing through the valve without changing the opening of the valve, and means to continually impart intermittent movement to the valve.

14. An automatic fuel regulating device, comprising an oil burner, a supply of fuel therefor, a valve interposed between the supply of fuel and the burner, means to vary the supply of fuel passing through the valve without varying the opening thereof, and means to impart continually an intermittent motion to the valve.

15. An automatic fuel regulating device, comprising an oil burner, a supply of fuel, a valve interposed between the supply of fuel and the oil burner, means to impart continually an intermittent motion to the valve, and thermostatic means for controlling the direction of the motion imparted to the valve.

Signed at Hartford, Connecticut, this 11th day of October, 1929.

WILLIAM T. HONISS.